Patented Nov. 4, 1947

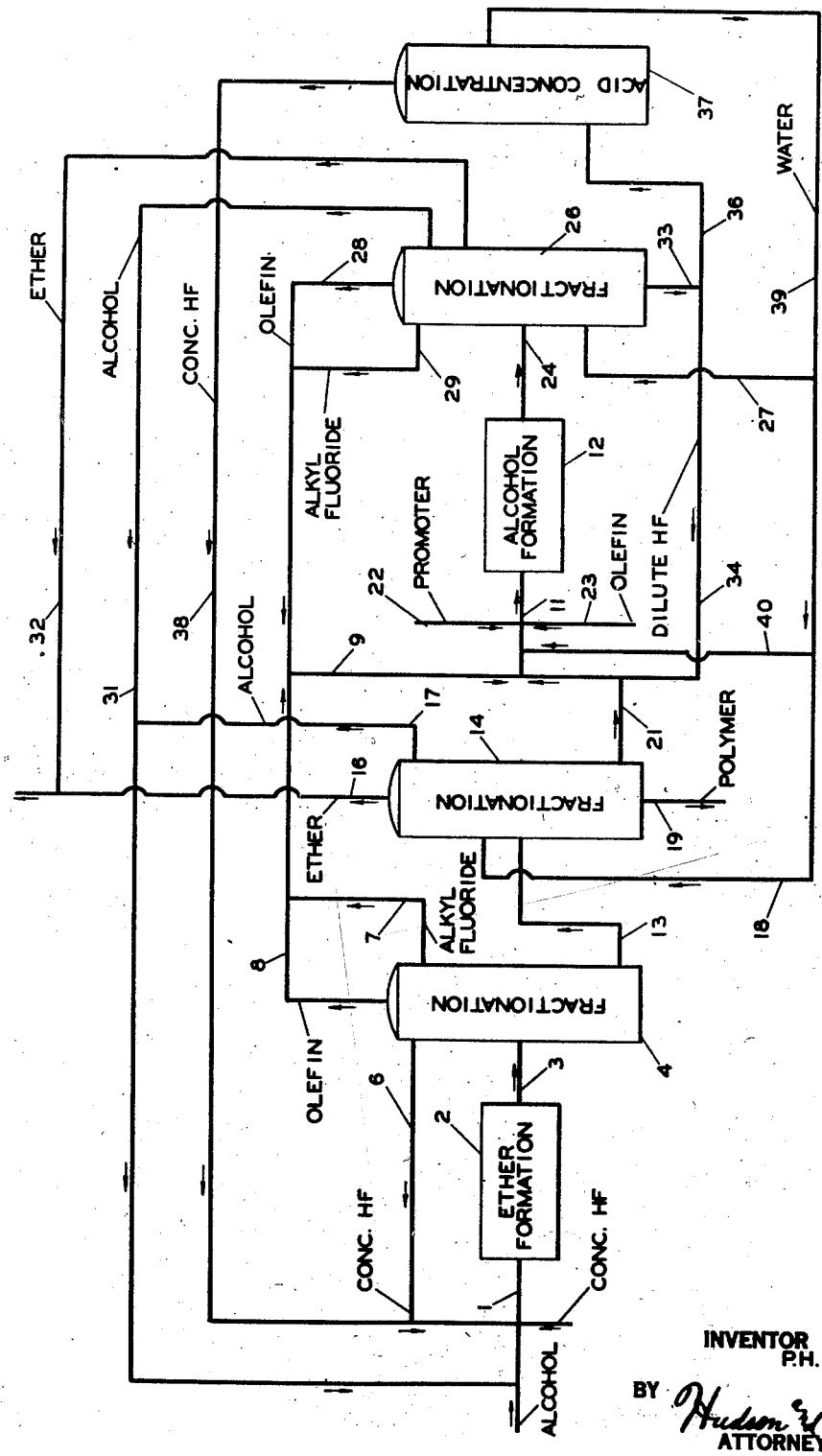

2,430,388

UNITED STATES PATENT OFFICE 2,430,388

PREPARATION OF ETHERS

Paul H. Carnell, Bartlesville, Okla., assignor to Phillips Petroleum Company, a corporation of Delaware Application January 11, 1945, Serial No. 572,336

7 Claims. (Cl. 260—614)

1

This invention relates to a process for the preparation of an ether. More particularly, this invention relates to a process for the preparation of an ether with the aid of hydrofluoric acid.

The present invention is particularly useful for the preparation of diethyl ether from ethylene and ethyl alcohol, or from either ethylene or ethyl alcohol.

Heretofore, ethers have been generally formed by treatment of the corresponding alcohols with sulfuric acid. Sulfuric acid, because of its strong tendency to undergo oxidation-reduction reactions causes the formation of an objectionable proportion of undesirable, sulfur containing, by-products. In contrast, hydrofluoric acid is free from the disadvantages of sulfuric acid.

Although anhydrous hydrofluoric acid has been tried in small-scale scientific experiments for the preparation of various simple and complex ethers from the corresponding alcohols and/or olefins, no fully satisfactory process for preparing ethers in high yield and purity with the aid of hydrofluoric acid has been available hitherto. Major difficulties have been:

1. An undesirable conversion of the alcohol or olefin to alkyl fluoride, wherefore the ultimate yield of ether has been reduced.

2. Recovery of the ether and unreacted alcohol free from hydrofluoric acid without neutralizing the acid or diluting the entire quantity of acid so that none of the acid is available in a concentrated form for recycling. Reconcentration of the entire quantity of dilute acid would be extremely costly.

The present invention comprises an improvement over those heretofore described in that the alkyl fluoride is hydrolyzed to alcohol and the alcohol is converted to ether, thus producing an increase in the ultimate yield of ether. Another improvement of this invention over the prior art is that a substantial proportion of the hydrofluoric acid is recovered in a concentrated form and is recycled. Also, alcohol and ether are recovered in a high yield, essentially free from hydrofluoric acid. Thus, this invention produces a product containing a minimum of undesirable impurities, in a high yield, along with optimum hydrofluoric acid recovery.

An object of this invention is to provide a process for the preparation of an ether.

Another object is to provide a process for the preparation of an ether from an alcohol.

Still another object is to provide a process for the production of an ether from an olefin.

Other objects and advantages will be apparent from the following detailed description with reference to the accompanying drawing which represents diagrammatically a specific embodiment of the process of this invention.

2

The invention is an advantageous combination of the following steps:

1. Reaction of suitable alcohols with anhydrous hydrofluoric acid under selected conditions. A wide range of pressures and temperatures may be used. In the reaction between concentrated hydrofluoric acid and ethyl alcohol, the acid concentration should be 95 to 100 per cent to insure maximum dehydration in a short contact time, thereby minimizing polymer formation. The mol ratio of acid to alcohol may vary, but is usually about 2:1. The temperature may vary but is preferably 200–250° C.

2. Fractionation to recover a substantial proportion of substantially pure anhydrous hydrofluoric acid, followed by dilution of the reaction mixture and fractionation to recover ether and alcohol.

The reaction mixture from the initial reaction between alcohol and hydrofluoric acid is fractionated to remove overhead substantially pure anhydrous acid, which is recycled to the initial reactor. The acid remaining in the reaction mixture is then diluted by the addition of water to below 40 per cent, preferably about 35 per cent or lower. Such dilution prevents distillation of undesirable ether-hydrofluoric acid and alcohol-water-hydrofluoric acid azeotropes, and thus the ether and the alcohol are recovered on further distillation in good yield essentially free from hydrofluoric acid.

3. Conversion of the olefin, and of the alkyl fluoride formed in the initial reaction between concentrated hydrofluoric acid and alcohol, to alcohol and then to ether.

The olefin and the alkyl fluoride are converted to the alcohol by reaction with dilute hydrofluoric acid, obtained from the initial reaction between concentrated hydrofluoric acid and alcohol, after removal of anhydrous hydrofluoric acid and dilution and fractionation of the reaction mixture. The concentration of the acid used in the hydrolysis of olefin and alkyl fluoride to alcohol may vary, but is usually 35 to 40 per cent. An inorganic fluoride promoter such as boron trifluoride, potassium tantalum fluoride, potassium fluoborate, strontium fluoride, calcium fluoride, aluminum fluoride, etc., may be added if desired. The hydration of olefins using concentrated hydrofluoric acid as a catalyst and an inorganic fluoride as a promoter is disclosed in the copending patent application of Frederick E. Frey, Serial No. 559,115, filed October 17, 1944. The mol ratio of the acid to olefin, including the olefin equivalent of any alkyl fluoride, may vary from 10 to 1, depending on the reactivity of the olefin or alkyl fluoride. The temperature may range from 25 to 260° C., depending on the olefin or alkyl fluoride.

4. Fractionation of the reaction mixture from the hydrolysis of alkyl fluoride and olefin, to recover ether and alcohol.

In the recovery of alcohol and ether from the hydrolysis mixture of olefin and alkyl fluoride with dilute hydrofluoric acid, the acid in the mixture to be fractionated is diluted to below about 40 per cent, preferably about 35 per cent or lower. Thus formation of HF-containing azeotropes of the alcohol or the ether is avoided, and ethers and alcohols essentially free from hydrofluoric acid are obtained.

With reference to the drawing, alcohol and concentrated hydrofluoric acid are charged through line 1 to a first reaction zone 2 provided with means for vigorously agitating the mixture. In the reactor 2, a portion of the alcohol is converted to the corresponding ether in the presence of the hydrofluoric acid. The effluent of the reaction zone comprises in addition to the ether, the corresponding alkyl fluoride, the corresponding olefin, hydrofluoric acid somewhat diluted with water, and a small amount of higher boiling polymeric material. The effluent is passed via line 3 to a first fractionation 4. The first fractionation may be accomplished in one or more fractionating columns for the separation of the reactor effluent into its various component parts as more fully explained hereinafter. From the first fractionation, concentrated hydrofluoric acid is recycled via line 6 to the reactor 2.

Alkyl fluoride and olefin from the fractionation are taken off via lines 7 and 8, respectively, and passed via lines 9 and 11 to a second reaction zone 12. From the first fractionation 4, ether, alcohol, dilute hydrofluoric acid, and polymeric material is passed through line 13 to a second fractionation 14. The second fractionation may be accomplished in one or more fractionating columns. Ether is withdrawn from the second fractionation via line 16 as a product of the process. Alcohol is withdrawn via line 17 and recycled to reactor 2. Water is supplied to the second fractionation from line 18 in an amount sufficient to dilute the hydrofluoric acid present therein to the extent required to prevent the formation of alcohol-acid-water and ether-acid azeotropes. High boiling polymeric material is withdrawn via line 19 through which it may be conducted to a depolymerization process forming no part of the present invention, or disposed of in some other suitable manner. Dilute hydrofluoric acid from the second fractionation is passed through lines 21 and 11 to reactor 12.

Reactor 12 is provided with means for intimate contact of reactants by vigorous agitation. Preferably, a promoter, e. g. boron trifluoride, is supplied to reactor 12 from a suitable source by way of line 22. Additional olefin may be supplied from line 23 and water, from line 40. In reactor 12, olefin and alkyl fluoride are converted, in the presence of dilute hydrofluoric acid, to alcohol. A small amount of ether is incidentally produced in this reactor. The effluent of the second reaction comprising alcohol, ether, alkyl fluoride, olefin, and dilute hydrofluoric acid is passed via line 24 to the third fractionation 26. The third fractionation is carried out in one or more fractionation columns. Water may be supplied to the fractionation system by way of line 27 to prevent formation of alcohol-water-acid or ether-acid azeotropes. Olefin and alkyl fluoride are withdrawn via lines 28 and 29, respectively, and recycled to reactor 12. Alcohol from the third fractionation passes through line 31 to the first reaction in reactor 2. Ether is withdrawn through line 32 as a product of the process. Dilute hydrofluoric acid is withdrawn through line 33 from which a portion is recycled by way of line 34 to reactor 12 and the balance passed by way of line 36 to an acid concentration in concentrator 37. The acid concentration may be effected by suitable means forming no part of the present invention. From the concentrator 37, concentrated hydrofluoric acid is removed via line 38 and recycled to reactor 2. Water is removed from concentrator 37 via line 39 and recycled to fractionation steps 14 and 26 and to reactor 12. Although the process illustrated in the drawing is generally useful for the preparation of various low-boiling ethers, it is especially advantageous for the preparation of diethyl ether.

The following data illustrate some of the many aspects of this invention.

ETHER FORMATION BY REACTING ALCOHOL WITH CONCENTRATED HYDROFLUORIC ACID

*Example 1*

A Monel bomb provided with a pressure gauge was charged with 152 grams of ethyl alcohol and 120 grams of anhydrous hydrofluoric acid. The bomb was placed on a suitable rocker. While the bomb was rocked continuously, the temperature was increased from 26 to 232° C. during a 55-minute period. The pressure increased from 0 p. s. i. at 26° C. to 970 p. s. i. at 232° C. The bomb was rocked for an additional hour while cooling. The following products were isolated from the reaction mixture:

|  | Grams |
|---|---|
| Diethyl ether | 53 |
| 95% alcohol | 40 |
| Polymer | 6–8 |
| Gas | 8 |

The gas was subjected to a fractional-distillation analysis, and the following percentage composition was determined:

| Gas | Wt. percent |
|---|---|
| Ethylene | 9.79 |
| Ethyl fluoride | 88.13 |
| Ethyl ether | 2.08 |

ETHER FORMATION WITH ALCOHOL AND DILUTE HF

*Example 2*

A Monel bomb provided with a pressure gauge was charged with 41 g. of ethyl alcohol and 260 g. of 35 per cent aqueous hydrofluoric acid. The bomb was placed on a suitable rocker. While the bomb was rocked continuously, the temperature was increased from 45 to 252° C. during a 50-minute period. The pressure increased from 0 p. s. i. at 45° C. to 760 p. s. i. at 252° C. The bomb was rocked for an additional hour while cooling. The following products were isolated from the reaction mixture:

|  | Grams |
|---|---|
| Ethyl alcohol | 23 |
| Diethyl ether | 2 |
| Gas | 4 |

The gas was subjected to a fractional analysis, and the following percentage composition was determined:

| Gas | Wt. percent |
|---|---|
| Hydrogen | 0.79 |
| Ethylene | 44.49 |
| Ethyl fluoride | 40.94 |
| Ether | 13.78 |

ALCOHOL FORMATION WITHOUT A PROMOTER

Examples 3 to 6

A Monel bomb was charged with a given quantity of olefin and hydrofluoric acid. The bomb was provided with a suitable pressure gauge and clamped to a rocker. While the bomb was rocked continuously, the temperature was increased over a specified range for a given contact time. The following results were obtained:

| Example | 3 | 4 | 5 | 6 |
|---|---|---|---|---|
| Olefin | Ethylene | Propylene | Butene-2 | Isobutylene |
| Acid conc., wt. percent | 35 | 50 | 40 | 10 |
| Acid, g | 91 | 130 | 104 | 26 |
| Olefin, g | 13 | 45 | 48 | 48 |
| Mol ratio, HF:Olefin | 10 | 6 | 6 | 2 |
| Reaction temp., °C. (approx.) | 236–258 | 71–75 | 118–122 | 76–79 |
| Reaction pressure, p. s. i. (approx.) | 900 | 370 | 280 | 160 |
| Reaction time, min, (approx.) | 30 | 80 | 20 | 50 |
| Polymer, g. (approx.) | 0 | 3 | 4 | 5 |
| Alcohol yield, wt. per cent of theor. yield (approx.) | 30 | 44 | 35 | 62 |

RESULTS

Example 4

Analysis of the product gas revealed the following composition:

| Gas | Mol percent |
|---|---|
| Propane | 41.74 |
| Propylene | 20.84 |
| Isopropyl fluoride | 37.42 |

Example 5

Analysis of the product gas revealed the following composition:

| Gas | Mol percent |
|---|---|
| Butene-2 | 87.49 |
| Sec. butyl fluoride | 12.51 |

Example 6

Analysis of the product gas revealed the following composition:

| Gas | Mol percent |
|---|---|
| Isobutylene | 84.53 |
| Butene-1 | 9.68 |
| Butene-2 | 5.79 |

ALCOHOL FORMATION IN THE PRESENCE OF A PROMOTER

Examples 7 to 9

A Monel bomb was charged with a given quantity of hydrofluoric acid and a promoter. The bomb was provided with a suitable pressure gauge and clamped to a rocker. While the bomb was rocked continuously the heat was increased to a given temperature. At this temperature the bomb was momentarily stopped and the olefin was charged. The bomb was then rocked for a given contact time over a given temperature range, and the pressure decay was recorded. At the end of a given contact time the bomb contents were discharged through a series of cooling coils, and the reaction mixture was fractionated to determine the alcohol yield. The results can be tabulated as follows:

| Example | 7 | 8 | 9 |
|---|---|---|---|
| Promoter | BF$_3$ | K$_3$TaF$_7$ | None |
| Charge: | | | |
|   Promoter, g | 22.2 | 25 | |
|   38% HF, g | 520 | 520 | 520 |
|   Ethylene, g | 16 | 17 | 17 |
| Initial pressure, p. s. i. | 900 | 810 | 800 |
| Initial temperature, °C | 241 | 238 | 238 |
| Contact time, min | 10 | 15 | 15 |
| Rate of pressure decay, p. s. i./min. after: | | | |
|   5 min | 32 | 8 | 4 |
|   10 min | 20 | 6 | 4 |
|   15 min | | 6 | 3 |
| Final pressure, p. s. i. | 700 | 725 | 750 |
| Final temperature, °C | 243 | 244 | 245 |
| Discharge time, min | 4.8 | 5.5 | 8 |
| Alcohol yield, per cent of theor. | 38 | 26 | 23 |

HYDROFLUORIC ACID-ALCOHOL-WATER AZEOTROPE

Examples 10 to 12

Mixtures of ethyl alcohol and various concentrations of hydrofluoric acid were fractionated in a copper column. Samples were collected in Monel bombs for analysis. Hydrofluoric acid was determined by alkalimetric titration. Ethyl alcohol was determined by the specific gravity of the solution obtained after neutralization of the hydrofluoric acid and distillation. Water was determined by difference. The results are shown in the following tabulation:

| Example | 10 | 11 | 12 |
|---|---|---|---|
| Acid conc., wt. per cent | 35 | 40 | 60 |
| Charge: | | | |
|   Acid, g | 91 | 104 | 156 |
|   Water, g | 169 | 156 | 104 |
|   Alcohol, g | 66 | 60 | 63 |
| Distillate fractions: | | | |
|   1 | 95% alc | 95% alc | conc. HF |
|   2 | H$_2$O | HF-alc.-H$_2$O azeo | HF-alc.-H$_2$O azeo. |
|   3 | HF-H$_2$O azeo | HF-H$_2$O azeo | HF-H$_2$O azeo. |
| Alcohol recover, per cent: | | | |
|   As 95% alcohol | 94 | 82 | 0. |
|   As acid-alc.-water azeo | 0 | 18 | 100. |

These examples show the formation of a ternary acid-alcohol water azeotrope boiling within the range of about 103° C. and containing approximately 30 per cent hydrogen fluoride, 60 per cent ethyl alcohol, and 10 per cent water (by difference). The samples analyzed were not purified beyond the initial distillation.

Ethyl alcohol is a member of a homologous series of alcohols which form ethers; the other members of the series form similar azeotropes with hydrofluoric acid and water, but naturally the boiling point and the composition vary with the individual members.

HYDROFLUORIC ACID-ETHER AZEOTROPE

Examples 13 to 15

Mixtures of diethyl ether, ethyl alcohol, water, and hydrofluoric acid were fractionated in a copper column. Hydrofluoric acid in the distillate fractionations was determined by alkalimetric titration. The results are shown in the following tabulation:

| Example | 13 | 14 | 15 |
|---|---|---|---|
| Acid conc., approx | 100 | 50 | 35 |
| Charge: | | | |
| Acid, g | 208 | 100 | 70 |
| Water, g | 2 | 100 | 130 |
| Absolute alcohol, g | 40 | 40 | 41 |
| Absolute ether, g | 63 | 65 | 62 |
| Ether recovery, per cent: | | | |
| 33-34° C | 0 | 74 | 92 |
| Ether-HF azeo | 97 | 23 | 0 |
| Anhydrous HF recovery, per cent | 68 | 0 | 0 |

This work showed the formation of a binary hydrofluoric acid-diethyl ether azeotrope that boiled at about 74° C. and contained about 40 per cent hydrofluoric acid and 60 per cent ether (by difference). The ethyl alcohol was fractionated out in Example 15; a 93 per cent recovery was obtained (B. P. 77-78° C.).

Example 16

Anhydrous hydrofluoric acid and ethyl alcohol in a ratio of about 2 mols of acid per mol of alcohol are charged to a first reaction zone and vigorously agitated for 50 minutes at 240° C. The products of the reaction are fractionated in a first fractionation. Ethylene (B. P. —104° C.) and ethyl fluoride (B. P. —32° C.) are passed to a second reaction zone. Concentrated hydrofluoric acid is removed and recycled to the first reaction zone. The remainder of the effluent is admixed with sufficient water to prevent the formation of an ethyl alcohol-water-acid azeotrope or a diethyl ether-acid azeotrope. Diethyl ether is removed from the second fractionation as product. Ethyl alcohol from the second fractionation is recycled to the first reaction zone. Polymer is removed and passed to a depolymerization unit. Dilute hydrofluoric acid from the second fractionation is passed to the second reaction zone where it is admixed with ethylene and ethyl fluoride. Boron trifluoride is added as a promoter and the resulting mixture vigorously agitated for 10 minutes at 250° C. From the second reaction zone the effluent comprising ethylene, ethyl fluoride, diethyl ether, ethyl alcohol, and dilute hydrofluoric acid, is passed to a third fractionation. The hydrofluoric acid in the effluent of the second reaction zone is somewhat more concentrated than the acid charged to the reaction zone due to the hydrolysis of ethyl fluoride to ethyl alcohol. Sufficient water is present in the third fractionation to prevent formation of either the alcohol-water-acid azeotrope or the ether-acid azeotrope. From the third fractionation, diethyl ether is removed as part of the product of the process. Ethylene and ethyl fluoride separated from the effluent of the third fractionation are recycled to the second reaction zone; ethyl alcohol, to the first reaction zone. A portion of the dilute hydrofluoric acid separated in the third fractionation is recycled to the second reaction zone. The remainder of the dilute acid is passed to a concentrator containing potassium fluoride deposited on charcoal. The concentrator temperature is maintained at about 125° C. The hydrofluoric acid is recovered as a coordination compound of potassium fluoride. The water passes through the bed of potassium fluoride and is recycled to the fractionation steps. Concentrated hydrofluoric acid from the concentrator (recovered by heating the potassium fluoride containing the hydrofluoric acid) is recycled to the first reaction zone.

I claim:

1. A process for the production of an ether which comprises subjecting an aliphatic monohydric alcohol to the action of substantially anhydrous hydrofluoric acid at a temperature within the range of from about 200° C. to about 250° C. in a first reaction zone; subjecting the effluent of the first reaction zone comprising unreacted alcohol, the corresponding olefin, the corresponding ether, the corresponding alkyl fluoride, water, and hydrofluoric acid to fractionation; separating substantially anhydrous hydrofluoric acid from the effluent of the first reaction zone and recycling same to said first reaction zone; separating said alkyl fluoride and said olefin from the effluent of the first reaction zone; separating said ether from the effluent of the first reaction zone as a product of the process; separating alcohol from the effluent of the first reaction zone and recycling same to the first reaction zone; separating dilute hydrofluoric acid having a hydrogen fluoride concentration within the range of about 10 to about 50 per cent by weight from the effluent of the first reaction zone and passing same in admixture with said alkyl fluoride and said olefin to a second reaction zone at a temperature within the range of from about 25° C. to about 260° C. wherein alcohol is formed; subjecting the effluent of second reaction zone comprising said alcohol, said olefin, said alkyl fluoride, said ether, water, and hydrofluoric acid to fractionation; separating said olefin and said alkyl fluoride from the effluent of the second reaction zone and recycling same to said second reaction zone; separating alcohol from the effluent of said second reaction zone and recycling same to said first reaction zone; separating ether from said second reaction zone as product of the process; and recycling dilute hydrofluoric acid from the effluent of said second conversion to said second conversion.

2. A process for the production of an ether which comprises subjecting an aliphatic monohydric alcohol to the action of substantially anhydrous hydrofluoric acid in a first reaction zone at a temperature within the range of about 200° C. to about 250° C. thereby effecting conversion of said alcohol to the corresponding ether with incidental production of the corresponding olefin, the corresponding alkyl fluoride, and water; separating said ether from the effluent of said first reaction zone as product; separating said alkyl fluoride and said olefin from the effluent of said first reaction zone and passing same to a second reaction zone in admixture with dilute hydrofluoric acid having a hydrogen fluoride concentration within the range of about 10 to about 50 per cent by weight at a temperature within the range of about 25° C. to about 260° C. thereby effecting simultaneous conversion of said olefin and said alkyl fluoride to said alcohol and said ether; separating said ether from the effluent of said second reaction zone as product of the process; and separating said alcohol from the effluent of said second reaction zone and passing same to said first reaction zone as part of the feed therefor.

3. In a process for the preparation of an ether, the steps comprising subjecting an aliphatic monohydric alcohol to the action of substantially anhydrous hydrofluoric acid in a reaction zone at a temperature within the range of about 200° C. to about 250° C. thereby effecting the formation of the corresponding ether, with the incidental production of the corresponding olefin, the corresponding alkyl fluoride, and water; separating said alkyl fluoride and said olefin from the effluent of said reaction zone; separating substantially anhydrous hydrofluoric acid from the effluent of said reaction zone and recycling same to said reaction zone; admixing sufficient water with the remainder of the effluent of said reaction zone comprising unreacted alcohol, ether, and dilute hydrofluoric acid to reduce the concentration of hydrogen fluoride in said acid to a value less than about 40 per cent by weight; subjecting the resulting mixture to fractionation; separating from said mixture said ether as a product of the process; separating unreacted alcohol from said mixture and recycling same to said reaction zone; and separating dilute hydrofluoric acid from said mixture.

4. In a process for the preparation of an ether, the steps comprising subjecting an aliphatic olefin and the corresponding alkyl fluoride to the action of dilute hydrofluoric acid having a hydrogen fluoride concentration within the range of about 10 to about 50 per cent by weight in a reaction zone at a temperature within the range of from about 25° C. to about 260° C. whereby the reactants are converted to the corresponding alcohol and the corresponding ether; withdrawing effluent from said reaction zone, said effluent comprising said olefin, said alkyl fluoride, said alcohol, said ether, and dilute hydrofluoric acid; subjecting the resulting mixture to fractionation in the presence of sufficient water to maintain the concentration of hydrogen fluoride in said dilute acid less than about 40 per cent by weight and separating ether therefrom as a product of the process; separating said alkyl fluoride and said olefin from said mixture and recycling same to said reaction zone; separating said alcohol from said mixture; and separating dilute hydrofluoric acid from said mixture.

5. A process for the production of diethyl ether which comprises subjecting ethyl alcohol to the action of substantially anhydrous hydrofluoric acid in a first reaction zone at a temperature within the range of about 200° C. to about 250° C. thereby effecting conversion of said alcohol to said ether with the incidental formation of ethylene, ethyl fluoride and water; separating said ether from the effluent of said first reaction zone as product; separating ethyl fluoride and ethylene from the effluent of said first reaction and passing same to a second reaction zone in admixture with dilute hydrofluoric acid having a hydrogen fluoride concentration within the range of about 10 to about 50 per cent by weight at a temperature within the range of from about 25 C. to about 260° C. thereby effecting simultaneous conversion of ethylene and ethyl fluoride to ethyl alcohol and diethyl ether; separating ethyl alcohol from the effluent of the second reaction zone and passing same to the first reaction zone; and separating diethyl ether from the effluent of said second reaction zone as product of the process.

6. A process for the production of diethyl ether which comprises subjecting ethyl alcohol to the action of substantially anhydrous hydrofluoric acid having a hydrogen fluoride concentration within the range of 95 to 100 per cent by weight in a first reaction zone at a temperature within the range of from about 200° C. to about 250° C. thereby effecting conversion of ethyl alcohol to diethyl ether with the incidental formation of ethylene and ethyl fluoride; separating ethylene, ethyl fluoride, and concentrated hydrofluoric acid from the effluent of the first reaction zone; adding sufficient water to the remainder of the effluent of first reaction zone to reduce the concentration of the hydrofluoric acid therein to less than about 35 per cent hydrogen fluoride by weight, separately recovering diethyl ether and ethyl alcohol from the resulting dilute hydrofluoric acid; and passing said dilute hydrofluoric acid in admixture with said ethylene and ethyl fluoride separated from said effluent of said first reaction zone to a second reaction zone at a temperature within the range of about 25° C. to about 250° C. thereby effecting conversion of said ethylene and ethyl fluoride to ethyl alcohol and diethyl ether; and separately recovering ethyl alcohol and diethyl ether from the effluent of said second reaction zone.

7. In the process for the production of an ether from the corresponding aliphatic monohydric alcohol by reaction of the alcohol with substantially anhydrous hydrofluoric acid, the improvement which comprises subjecting the effluent of said reaction comprising said ether, hydrofluoric acid, and unreacted alcohol to fractional distillation in the presence of sufficient water to reduce the concentration of hydrogen fluoride in said acid to a value below about 35 per cent by weight and separating said ether and said alcohol essentially free from hydrofluoric acid from the mixture undergoing distillation.

PAUL H. CARNELL.

REFERENCES CITED

The following references are of record in the file of this patent:

UNITED STATES PATENTS

| Number | Name | Date |
|---|---|---|
| 2,135,455 | Loder | Nov. 1, 1938 |

OTHER REFERENCES

Burwell, Jour. Am. Chem. Soc., vol. 64, pp. 1025–1031.

Meslans, Comp. Rend., vol. 115, p. 1080 (1892).

Certificate of Correction

Patent No. 2,430,388.  November 4, 1947.

PAUL H. CARNELL

It is hereby certified that errors appear in the printed specification of the above numbered patent requiring correction as follows: Column 7, line 7, for "distilllation" read *distillation*; line 21, for "fractionations" read *fractions*; and that the said Letters Patent should be read with these corrections therein that the same may conform to the record of the case in the Patent Office.

Signed and sealed this 27th day of January, A. D. 1948.

[SEAL]

THOMAS F. MURPHY,
*Assistant Commissioner of Patents.*